June 6, 1972   M. S. KISSEL   3,667,711
HANGER FOR PIPES AND CONDUITS
Filed Oct. 13, 1970
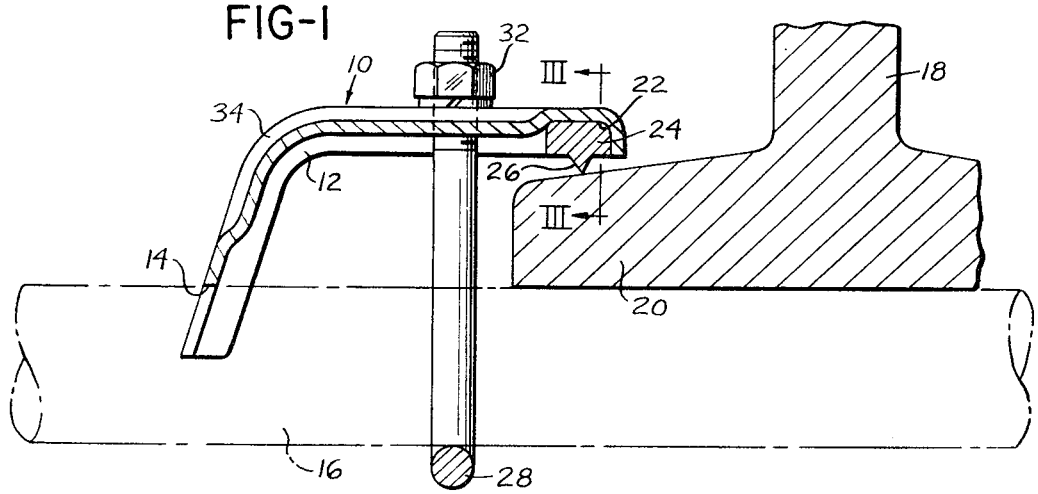
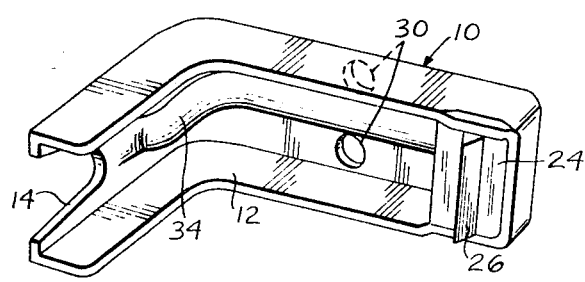
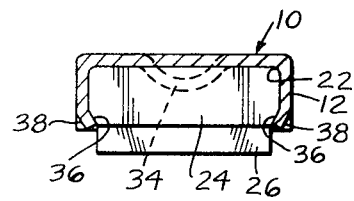
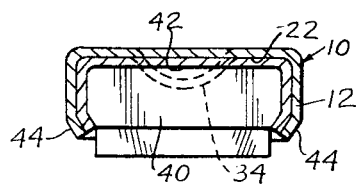
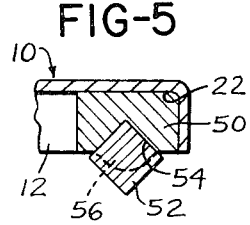
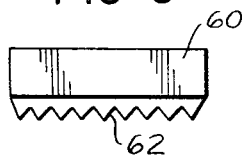
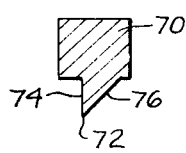
INVENTOR.
MARTIN S. KISSEL
BY

3,667,711
HANGER FOR PIPES AND CONDUITS
Martin S. Kissel, 806 Main St., Latrobe, Pa. 15650
Filed Oct. 13, 1970, Ser. No. 80,273
Int. Cl. F16l 3/04
U.S. Cl. 248—72     9 Claims

ABSTRACT OF THE DISCLOSURE

The specification discloses a hanger for supporting a pipe or conduit or the like on a flange, such as the flange of a beam. The hanger is in the form of an L shaped member adapted to engage the upper side of the flange at one end of one of the legs and to engage the top of the pipe or the like with the end of the other of the legs. A U bolt embracing the pipe or the like from beneath has leg portions extending through the ranger and receiving nuts to clamp the assembly fixedly in place.

---

The present invention relates to pipe hangers and the like and is particularly concerned with a hanger for connecting pipes and conduits and the like to flanges, such as the flanges of structural beams.

Substantially all building structures, particularly industrial structures and the like, have pipes and conduits and the like in overhead locations and quite often there are also exposed beams which can be availed of for supporting the pipes and conduits.

It is in connection with a hanger device for supporting the pipes or conduits or the like on the flanges of such beams that the present invention is concerned. The pipe hanger according to the present invention is similar in certain respects to the pipe hanger illustrated in the C. C. Korns United States Patent No. 1,319,652, but has definite advantages thereover.

With the foregoing in mind, a primary objective of the present invention is the provision of a pipe hanger of improved design.

A further object of the present invention is the provision of a pipe hanger of the nature referred to which is inherently somewhat resilient thereby to be able to withstand vibration and the like.

Still another object is the provision of a pipe hanger of the nature referred to which is inexpensive to make.

The foregoing objects as well as still other objects and advantages of the present invention will become more apparent upon reference to the following detailed specification taken in connection with the accompanying drawings in which:

FIG. 1 is a longitudinal sectional view through a pipe hanger according to the present invention;

FIG. 2 is a perspective view looking at the pipe hanger somewhat from the lower, or concave, side thereof;

FIG. 3 is a transverse section through one form which a hanger according to the present invention can take and is indicated by line III—III on FIG. 1;

FIG. 4 is a view like FIG. 3 but showing a modified construction;

FIG. 5 is a fragmentary sectional view showing a portion of a still further modified form of the pipe hanger according to the present invention;

FIG. 6 is a view showing a hard steel cleat member forming a part of the invention and of modified form; and FIG. 7 is a cross sectional view showing another form in which the cleat member can take.

BRIEF SUMMARY OF THE INVENTION

The present invention proposes a pipe hanger formed of pressed steel and having a body which is substantially L shaped with a hardened cleat carried at the outer end of one of the legs of the body member and with the outer end of the other leg of the body member formed with a notch to engage over a pipe.

A U bolt passing around the bottom of the pipe has threaded legs extending through the first mentioned leg of the pipe hanger and when the flange of a beam or the like is introduced between the pipe and the hardened cleat, nuts can be drawn up on the legs of the U bolt and the entire assembly fixedly clamped together.

The body part of the hanger is formed of pressed steel and has a peripheral flange depending on the concave side of the hanger so that the hanger is extremely strong but somewhat resilient, and will not become loose due to vibration.

Still further, the hanger preferably has a stiffening rib formed therein to impart strength to the hanger so that it will withstand high clamping forces.

DETAILED DESCRIPTION

Referring to the drawings somewhat more in detail, FIG. 1 shows a pipe hanger according to the present invention with a body part generally indicated at 10 and being a substantially L shaped pressed steel member having a peripheral flange 12 depending therefrom on the inner or concave side of the body member. The end of one leg of the body member is formed with a notch 14 for engaging over a pipe or conduit or a like member 16. The member 16 abuts the bottom of a structural member 18 having a flange 20.

The body of the pipe hanger comprises a second leg extending at an angle to the first mentioned leg and the dependent flange 12 extends across the outer end of the last mentioned leg and forms a pocket 22. Mounted in pocket 22 is a bar-like cleat element 24 having a sharp rib 26 upstanding therefrom on the flange side.

A U bolt 28 engages member 16 from beneath and has leg parts extending upwardly through holes 30 provided therefor in the leg of the body member which carries bar-like cleat element 24. Nuts 32 threaded on the leg parts of the U bolt can be drawn up thereby fixedly to clamp the assembly together and to cause the sharp hard rib of bar-like element 24 to bit into the upper side of flange 20 of structural member 18.

Bar-like element 20 is preferably formed of a hardened steel so that the sharp rib can readily bite into the flange 20 of the structural member and thereby fixedly hold the hanger and the pipe supported thereby in position.

The body of the pipe hanger is preferably formed with a longitudinal rib 34 pressed therein from the outer or convex side of the body member and extending the major portion of the length of both legs of the body of the hanger as will be seen in FIGS. 1 and 2. This rib imparts great strength to the pipe hanger but does not interfere with the inherent resilience thereof which comes about due to the shape of the body member and material from which it is made.

As will be seen in FIG. 3, the bar-like cleat element 24 may be held in pocket 22 by forming recesses 36 in the ends of the cleat element and crimping the dependent flange 12 of the body member inwardly as at 38. This is preferable to welding or brazing the cleat element into position, although this could be done if the cleat element were formed of, for example, an air hardening steel or the like.

As will be seen in FIG. 4, the bar-like cleat element 40 illustrated therein may be supported within a box-like steel holder 42 which is seated in pocket 22 at the end of the one leg of the body of the pipe hanger. As before, the lower edge of flange 12 of the body could be crimped inwardly as at 44 to retain the bar-like cleat element and the steel holder therefor in position in the end of the one leg of the body of the pipe hanger.

FIG. 5 shows a modification of the cleat member in which a cast or pressed steel saddle member 50 is provided adapted to seat in pocket 22 and with a hardened cleat member 52 adapted to seat in a notch 54 formed in saddle member 50. The cleat member in this case can be simply a rectangular element and the assembly of the body of the saddle member and cleat element can be effected by inwardly crimping portions 56 of the body of the pipe hanger at the ends of the saddle member and cleat element.

As will be seen in FIG. 6, a cleat element 60 can be formed having a serrated or saw toothed edge 62 in order to enhance the gripping of the flange by the cleat element when the U bolt is tightened up.

FIG. 7 shows a still further cleat element 70 having a sharp edge at 72 to bite into the flange with the side of the cleat element facing away from the structural member being substantially vertical as at 74 while the other side thereof, at 76, diverges from the flange surface. With the arrangement shown in FIG. 7, the sharp edge of the cleat will always bite firmly into the flange of the structural member even though the pipe hanger tilts at different degrees relative thereto due to the thickness of the respective flange engaged thereby.

According to the present invention, the pipe hanger is constructed so as to be economical to make while at the same time the advantage of an extremely strong pipe hanger is realized and one which is somewhat resilient so that it will not become loose even in the presence of vibration. The hanger can be made to any desired size and can be employed for supporting small pipes or for supporting pipes of substantial size.

Modifications may be made within the purview of the appended claims.

What is claimed is:

1. In a hanger for a piper or the like; a body member comprising first and second legs in angular relation interconnected at their one ends to form a generally L shaped member, said body member being formed of sheet metal, a peripheral flange on said body member projecting toward the concave side thereof and extending around three sides of the free end of said first leg to form a pocket, a sharp cleat element on the free end of said first leg in the form of a bar in said pocket and having a sharp rib projecting beyond said flange, means fixing said bar to said first leg, a notch formed in the free end of said second leg for engagement over a pipe or the like extending generally parallel to said first leg, and laterally spaced holes in said first leg adapted to receive the legs of a U bolt engaging said pipe from beneath whereby the flange of a beam or the like can be introduced between said pipe and said first leg and nuts drawn up on said U bolt legs will clamp the said pipe against the bottom of said flange while said sharp cleat element is caused to bite into the top of said flange.

2. A hanger according to claim 1 in which said means fixing said bar to said first leg comprises recessed regions formed in said bar at the opposite ends thereof and portions of said flange crimped into said recessed regions.

3. A hanger according to claim 1 in which said means fixing said bar to said first leg comprises a holder for said bar, said holder being nested in said pocket, and means fixing said bar in said holder and said holder to said first leg.

4. A hanger according to claim 3 in which at least said means fixing said holder to said first leg comprises crimped in portions of said flange engaging opposite ends of said holder.

5. A hanger according to claim 1 in which said body member comprises a strengthening rib extending longitudinally of said legs from a point near said cleat element in said first leg to a point near said notch in said second leg.

6. A hanger according to claim 5 in which said strengthening rib is in the form of a continuous recess press formed into said body member from the convex side thereof so the rib upstands on the concave side of said body member, said recess being arcuate in cross section and being uninterrupted in the longitudinal direction thereof between said points.

7. A hanger according to claim 1 in which said bar is formed of a material harder than the material of said body member.

8. A hanger according to claim 7 in which said rib on said bar is formed with teeth.

9. A hanger according to claim 8 in which said rib has the edge that engages said flange formed with the side toward the outer end of the respective divergent from the surface of the flange and the other side at a steep angle to the surface of the flange.

References Cited

UNITED STATES PATENTS

| | | | |
|---|---|---|---|
| 1,319,652 | 10/1919 | Korns | 248—72 |
| 2,875,969 | 3/1959 | Thompson | 248—72 |
| 3,138,360 | 6/1964 | Matthiessen | 248—72 |
| 2,733,034 | 1/1956 | Tormo | 248—72 |

CHANCELLOR E. HARRIS, Primary Examiner

U.S. Cl. X.R.

248—228